(12) United States Patent
Koseki

(10) Patent No.: US 7,748,048 B2
(45) Date of Patent: Jun. 29, 2010

(54) STORAGE MEDIUM, METHOD OF PRODUCING TRANSFER FILE DATA, AND DATA SIGNAL

(75) Inventor: Kazumasa Koseki, Sagamihara (JP)

(73) Assignee: Namco Bandai Games, Inc., Tokyo (JP)

( * ) Notice: Subject to any disclaimer, the term of this patent is extended or adjusted under 35 U.S.C. 154(b) by 483 days.

(21) Appl. No.: 11/432,415

(22) Filed: May 12, 2006

(65) Prior Publication Data

US 2006/0265378 A1 Nov. 23, 2006

(30) Foreign Application Priority Data

May 17, 2005 (JP) .............................. 2005-143623

(51) Int. Cl.
G06F 17/30 (2006.01)
G06F 11/30 (2006.01)

(52) U.S. Cl. ........................................ 726/31; 713/193
(58) Field of Classification Search .................. 463/43; 726/31; 713/193
See application file for complete search history.

(56) References Cited

U.S. PATENT DOCUMENTS

| | | | | |
|---|---|---|---|---|
| 4,446,519 A | * | 5/1984 | Thomas | 711/164 |
| 4,658,093 A | * | 4/1987 | Hellman | 705/52 |
| 4,683,968 A | * | 8/1987 | Appelbaum et al. | 705/59 |
| 4,791,565 A | * | 12/1988 | Dunham et al. | 726/31 |
| 4,866,769 A | * | 9/1989 | Karp | 705/56 |
| 4,924,378 A | * | 5/1990 | Hershey et al. | 726/29 |
| 4,937,863 A | * | 6/1990 | Robert et al. | 710/200 |
| 5,014,234 A | * | 5/1991 | Edwards, Jr. | 726/33 |
| 5,023,907 A | * | 6/1991 | Johnson et al. | 710/200 |
| 5,390,297 A | * | 2/1995 | Barber et al. | 726/29 |
| 5,579,479 A | * | 11/1996 | Plum | 726/28 |
| 5,673,315 A | * | 9/1997 | Wolf | 705/59 |
| 5,701,463 A | * | 12/1997 | Malcolm | 707/10 |
| 5,754,763 A | * | 5/1998 | Bereiter | 726/28 |
| 5,822,771 A | * | 10/1998 | Akiyama et al. | 711/162 |
| 5,826,011 A | * | 10/1998 | Chou et al. | 726/31 |
| 5,995,625 A | * | 11/1999 | Sudia et al. | 705/51 |
| 6,006,190 A | * | 12/1999 | Baena-Arnaiz et al. | 705/1 |

(Continued)

FOREIGN PATENT DOCUMENTS

JP  A-7-225550  8/1995

(Continued)

OTHER PUBLICATIONS

Nintendo DS Manual. "http://www.mariosunshine.ca/consumer/downloads/ds_english.pdf".*

(Continued)

Primary Examiner—Brandon S Hoffman
(74) Attorney, Agent, or Firm—Oliff & Berridge, PLC

(57) ABSTRACT

A transfer file stored in a game cartridge has a transfer file nested structure in which a transfer file in which a game program is converted into a transfer file is further converted into a transfer file. Specifically, the game program is converted into a transfer file at a level "1" (base level) of the nested structure, and a transfer file [n−1] converted at an immediately lower level "n−1" and the game program are converted into a transfer file at a level "n". Note that n=1, 2, ... N.

20 Claims, 13 Drawing Sheets

U.S. PATENT DOCUMENTS

| | | | | |
|---|---|---|---|---|
| 6,021,438 | A * | 2/2000 | Duvvoori et al. | 709/224 |
| 6,073,123 | A * | 6/2000 | Staley | 705/58 |
| 6,161,179 | A * | 12/2000 | Seidel | 713/168 |
| 6,226,747 | B1 * | 5/2001 | Larsson et al. | 726/31 |
| 6,574,612 | B1 * | 6/2003 | Baratti et al. | 705/59 |
| 6,959,291 | B1 * | 10/2005 | Armstrong et al. | 705/59 |
| 7,051,211 | B1 * | 5/2006 | Matyas et al. | 713/187 |
| 7,225,340 | B2 | 5/2007 | Asahi et al. | |
| 7,382,254 | B2 * | 6/2008 | Posamentier | 340/572.1 |
| 7,477,745 | B2 * | 1/2009 | Nakamura et al. | 380/243 |
| 7,484,104 | B2 | 1/2009 | Masui et al. | |
| 7,486,790 | B1 * | 2/2009 | Selinfreund et al. | 380/201 |
| 7,500,108 | B2 * | 3/2009 | Johnson et al. | 713/187 |
| 2002/0077985 | A1 * | 6/2002 | Kobata et al. | 705/51 |
| 2002/0077986 | A1 * | 6/2002 | Kobata et al. | 705/52 |
| 2002/0082997 | A1 * | 6/2002 | Kobata et al. | 705/51 |
| 2002/0083318 | A1 * | 6/2002 | Larose | 713/164 |
| 2003/0023966 | A1 * | 1/2003 | Shimizu et al. | 717/175 |
| 2003/0041243 | A1 * | 2/2003 | Olguin et al. | 713/172 |
| 2003/0216824 | A1 * | 11/2003 | Chu et al. | 700/94 |
| 2003/0233547 | A1 * | 12/2003 | Gaston et al. | 713/168 |
| 2005/0015608 | A1 * | 1/2005 | Peterson | 713/193 |

FOREIGN PATENT DOCUMENTS

| | | |
|---|---|---|
| JP | A-9-81650 | 3/1997 |
| JP | A-10-91557 | 4/1998 |
| JP | A-2000-215120 | 8/2000 |
| JP | A-2000-236328 | 8/2000 |
| JP | A-2002-244929 | 8/2002 |
| JP | A-2003-283486 | 10/2003 |
| JP | B2 3597051 | 9/2004 |
| JP | A-2004-288091 | 10/2004 |
| JP | A-2005-95697 | 4/2005 |

OTHER PUBLICATIONS

Craig Harris. Official Nintendo DS Launch Details. Sep. 20, 2004, "http://ds.ign.com/articles/549/549919p1.html".*

"HowTo: Limit the Number of Times an Install Can be Run", Document ID IR02029, posted Oct. 17, 2002, sourced from http://www.indigorose.com/forums/showthread.php?t=5019.*

* cited by examiner

[STORAGE GS FILE CREATION PROCESSING]

US 7,748,048 B2

STORAGE MEDIUM, METHOD OF PRODUCING TRANSFER FILE DATA, AND DATA SIGNAL

Japanese Patent Application No. 2005-143623 filed on May 17, 2005, is hereby incorporated by reference in its entirety.

BACKGROUND OF THE INVENTION

The present invention relates to a computer-readable storage medium storing transfer file data in which software is converted into a transfer file, and the like.

As technology for transmitting and receiving data between computers, technology has been known in which a client such as a portable terminal is removably connected with a host such as a video game device (e.g. consumer game device) or a consumer console (e.g. personal computer), a program recorded on a recording medium (e.g. CD-ROM) provided in the host is downloaded to the client, and the program is operated (executed) in the client (see Japanese Patent No. 3597051, for example).

In recent years, a portable game device may have a software sharing function which allows the portable game device to transfer a game program (software) between the portable game device and another game device of the same type through wireless/wired communication and allows the receiver-side game device to execute the received game program. In this case, the game program to be transferred is converted in advance into a transfer file by specific file conversion processing including encryption (transfer file conversion), and the transfer file is stored in an information storage medium (e.g. game cartridge) which can be inserted into and removed from the game device.

The transmitter-side game device transmits transfer file data stored in the information storage medium to another game device. The receiver-side game device receives the transmitted transfer file data, restores the original game program before being converted into the transfer file, and executes the restored game program.

Specifically, since it suffices that the transmitter-side game device transmit the transfer file data and the receiver-side game device receive the transfer file data and restore the data contained in the transfer file data, the game device is not provided with the function of converting software into a transfer file. In order to prevent software from being illegally copied, duplicated, or altered to ensure the security of the product, the game device is not provided with the function of copying software.

In view of such restrictions on the configuration, the game program (software) is transferred between only the game device into which the information storage medium is inserted and another game device (i.e. between two generations). Therefore, it is difficult to transfer the game program over three or more generations, such as transmitting the received transfer file to still another game device.

SUMMARY

According to a first aspect of the invention, there is provided a computer-readable storage medium having transfer file data transferred between computers stored therein, the transfer file data having a transfer file nested structure in which software is converted into a transfer file in a nested manner and being restored to a state before being converted into the transfer file by restoration processing of the computer.

According to a second aspect of the invention, there is provided a method of producing transfer file data transferred between computers, the method comprising converting software into a transfer file in a nested manner to form a transfer file nested structure.

According to a third aspect of the invention, there is provided a data signal which is a carrier wave comprising transfer file data transferred between computers, the transfer file data having a transfer file nested structure in which software is converted into a transfer file in a nested manner and being restored to a state before being converted into the transfer file by restoration processing of the computer.

DETAILED DESCRIPTION OF THE EMBODIMENT

Figure 1:
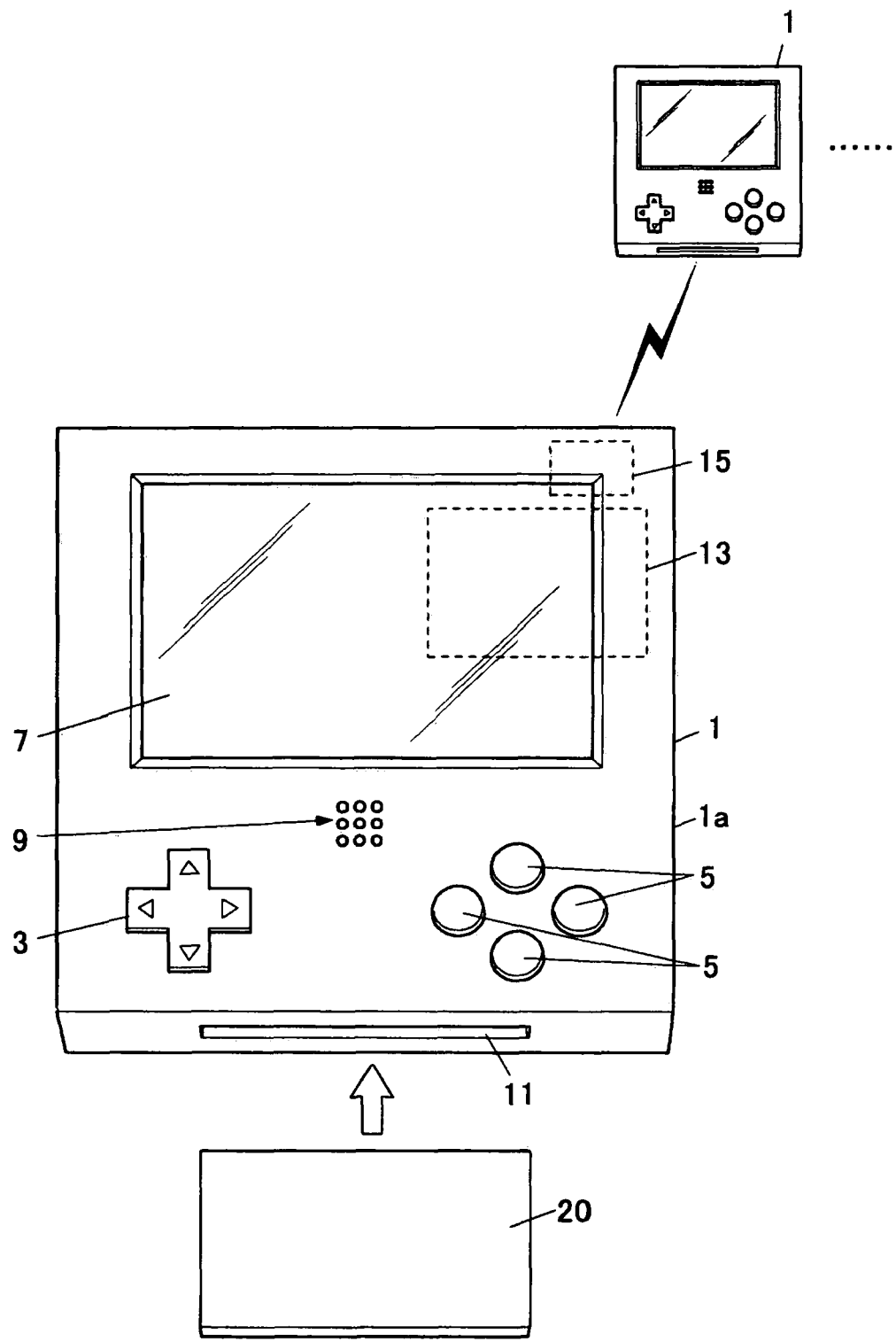
FIG. 1 is an outside appearance example of a portable game device.

An object of the invention is to enable transfer of a transfer file over three or more generations among computers having a software sharing function.

One embodiment of the invention relates to a computer-readable storage medium having transfer file data transferred between computers stored therein, the transfer file data having a transfer file nested structure in which software is converted into a transfer file in a nested manner and being restored to a state before being converted into the transfer file by restoration processing of the computer.

According to this embodiment, transfer file data having a transfer file nested structure is realized in which transfer file data in which software is converted into a transfer file is further converted into a transfer file. Specifically, since data received from another computer and restored to a state before being converted into the transfer file is also transfer file data having a transfer file nested structure, the restored transfer file data can be transmitted to still another computer. Therefore, the transfer file can be transferred over three or more generations.

In the storage medium according to this embodiment, the software may be converted into a transfer file at a base level of the nested structure, and the software and transfer file data converted into a transfer file at an immediately lower level may be converted into a transfer file at a level higher than the base level, whereby the transfer file data may be provided with the transfer file nested structure.

According to this configuration, the software is converted into a transfer file at the base level of the nested structure, and the software and the transfer file converted into a transfer file at an immediately lower level are converted into a transfer file at a level higher than the base level, whereby the transfer file data is provided with the transfer file nested structure. Specifically, the data restored to a state before being converted into the transfer file contains the transfer file data and the software at a level higher than the base level, and contains the software at the base level. Therefore, the restored software can be executed in each generation to which the transfer file data has been transferred.

In the storage medium according to this embodiment, the conversion into a transfer file may include at least encryption, and the transfer file data may be decrypted during the restoration processing.

According to this configuration, since the software and the transfer file data are converted into a transfer file in an encrypted state, the security during transfer of the transfer file data is ensured. In particular, this configuration is advantageous when the transfer file data is transferred through wireless communication.

In the storage medium according to this embodiment, the conversion into a transfer file may include at least compression, and the transfer file data may be decompressed during the restoration processing.

According to this configuration, since the software and the transfer file data are converted into a transfer file in a compressed state, the amount of data of the transfer file after conversion into the transfer file is reduced, whereby the load of transferring the transfer file data is reduced.

In the storage medium according to this embodiment, the software at each level of the nested structure may be software for causing a computer to execute processing corresponding to each level of the nested structure.

According to this configuration, the software at each level of the nested structure is software for causing a computer to execute processing corresponding to each level. Therefore, processing corresponding to each level of the nested structure of the restored transfer file data is executed in each generation to which the transfer file data can be transferred.

In the storage medium according to this embodiment, the software may be software for causing a transfer destination computer which has restored the software to manage transfer history of the transfer file data between the computers as succession history information, and update the managed succession history information by acquiring device identification information of a transfer source computer and/or succession history information managed by the transfer source computer from the transfer source computer.

According to this configuration, the transfer history of the transfer file data between computers is managed as the succession history information, and the managed succession history information is updated by acquiring the device identification information and/or the succession history information from the transfer source computer. Therefore, the user can be notified of the generation of the computer which has restored the software or the computer through which the received transfer file data has been transferred by referring to the succession history information.

In the storage medium according to this embodiment, the software may be software for causing the transfer destination computer which has restored the software to perform specific transfer history-related processing based on the managed succession history information.

According to this configuration, the transfer history-related specific processing such as display processing is performed based on the succession history information.

In the storage medium according to this embodiment, the software may be software for causing a transfer destination computer which has restored the software to determine a period of time elapsed after the restoration of the software, and prohibit execution of the software when the determined period of time elapsed has reached a predetermined executable period.

According to this configuration, execution of the software is prohibited when the period of time elapsed after the restoration of the software has reached the predetermined executable period. Therefore, execution of the restored software can be limited when producing a transfer file by providing the executable period converted into a transfer file in a transfer file.

In the storage medium according to this embodiment, the software may be software for causing a transfer destination computer which has restored the software to count a number of times that the software is executed after the restoration of the software, and prohibit execution of the software when the counted number has reached a predetermined executable count.

According to this configuration, execution of the software is prohibited when the execution count after the restoration of the software has reached the predetermined executable count. Therefore, execution of the restored software can be limited when producing a transfer file by providing the executable count converted into a transfer file in a transfer file.

In the storage medium according to this embodiment, the software at each level of the nested structure may be software for causing a computer which has restored the software at the level to execute main processing, and receive execution reference data, which is data necessary for the main processing and is read and used when executing the main processing, from a transfer source computer.

According to this configuration, the main processing is executed by executing the restored software, and the execution reference data necessary for the main processing is received from the transfer source computer.

In the storage medium according to this embodiment, the software may be software for causing a computer which has restored the software to determine whether or not to receive the execution reference data based on at least whether or not the execution reference data has been received, and receive the execution reference data from a transfer source computer when the computer has determined that the execution reference data is to be received.

According to this configuration, when the execution reference data has not been received, the execution reference data is received from the transfer source computer.

In the storage medium according to this embodiment, the software may be software for causing a computer which has restored the software to determine whether or not to receive the execution reference data based on whether or not the execution reference data has been received and free space in a memory.

According to this configuration, whether or not to receive the execution reference data is determined based on the free space in the memory in which the execution reference data is stored.

In the storage medium according to this embodiment, the software may be software for causing a transfer destination computer which has restored the software to select the execution reference data to be received from a plurality of pieces of execution reference data stored in a transfer source computer based on free space in a memory, and receive the selected execution reference data.

According to this configuration, the execution reference data selected from the execution reference data based on the free space in the memory is received.

In the storage medium according to this embodiment, the software may be game software for executing a specific game, the execution reference data may include a plurality of pieces of game data, and the software may be software for causing a computer which has restored the software to determine the level of the nested structure of the restored software, and execute a game based on the game data selected from the game data included in the received execution reference data corresponding to the determined level.

According to this configuration, the software converted into a transfer file is the game software, the pieces of game data are included in the execution reference data, and the game based on the game data corresponding to the level of the nested structure of the restored software is executed.

In the storage medium according to this embodiment, the execution reference data may include a plurality of pieces of game stage information as the game data, and the software may be game software for causing a computer which has restored the software to execute a game based on the game stage information selected from the game stage information included in the received execution reference data corresponding to the determined level.

According to this configuration, the pieces of game stage information are included in the execution reference data, and the game based on the game stage information corresponding to the level of the nested structure of the restored software is executed.

In the storage medium according to this embodiment, the execution reference data may include a plurality of pieces of character information as the game data, and the software may be game software for causing a computer which has restored the software to execute a game based on the character information selected from the character information included in the received execution reference data corresponding to the determined level.

According to this configuration, the pieces of character information are included in the execution reference data, and the game based on the character information corresponding to the level of the nested structure of the restored software is executed.

Another embodiment of the invention relates to a method of producing transfer file data transferred between computers, the method comprising converting software into a transfer file in a nested manner to form a transfer file nested structure.

In the method according to this embodiment, the software may be converted into a transfer file at a base level, and the software and transfer file data converted into a transfer file at an immediately lower level may be converted into a transfer file at a level higher than the base level to form the transfer file nested structure.

A further embodiment of the invention relates to a data signal which is a carrier wave comprising transfer file data transferred between computers, the transfer file data having a transfer file nested structure in which software is converted into a transfer file in a nested manner and being restored to a state before being converted into the transfer file by restoration processing of the computer.

In the data signal according to this embodiment, the software may be converted into a transfer file at a base level of the nested structure, and the software and transfer file data converted into a transfer file at an immediately lower level may be converted into a transfer file at a level higher than the base level, whereby the transfer file data is provided with the transfer file nested structure.

Embodiments of the invention are described below with reference to the drawings. The following description illustrates the case of applying the invention to a portable game device which executes a specific game and converting a program which is a representative example of software into a transfer file. Note that the embodiments to which the invention can be applied are not limited thereto.

Outside Appearance of Portable Game Device

FIG. 1 is an outside view showing an example of a portable game device 1 according to this embodiment. In FIG. 1, the portable game device 1 includes an approximately quadrilateral housing formed to have such a size that the user can conveniently carry the portable game device 1. A direction key 3, button switches 5, a display 7, and a speaker 9 are provided on the front of the housing. A card slot 11 for inserting a game cartridge 20, a power supply switch (not shown), a volume control button (not shown), and the like are provided on the side of the housing.

A control device 13 including a CPU and an IC memory, a wireless communication device 15 for transmitting and receiving data to and from another portable game device 1, a read device for reading data from the game cartridge 20 inserted into the card slot 11, and the like are provided inside the housing. The CPU provided in the control device 13 executes various types of game processing based on operation signals input using the direction key 3 and the button switches 5, a program and data read from the game cartridge 20, and the like to generate game image signals and game sound signals. The CPU outputs the generated image signals to the display 7 to cause the display 7 to display a game screen, and outputs the generated game sound signals to the speaker 9 to cause the speaker 9 to output game sound. The user enjoys the game by operating the direction key 3 and the button switches 5 while watching the game screen displayed on the display 7, for example.

Information (e.g. system program, game program, and game data) necessary for the portable game device 1 to execute the game or the like is stored in the IC memory provided in the control device 13 and the game cartridge 20. In more detail, the system program is stored in the IC memory of the control device 13, and the game program and the game data are stored in the game cartridge 20. Therefore, the portable game device 1 is caused to execute a different game by replacing the game cartridge 20.

Software Sharing Function

The portable game device 1 has a software sharing function. The software sharing function allows data (e.g. game program) to be transferred (transmitted) from one portable game device 1 to another portable game device 1 through the wireless communication device 15, and allows the receiver-side portable game device 1 to execute the game according to the received game program.

Figure 2:
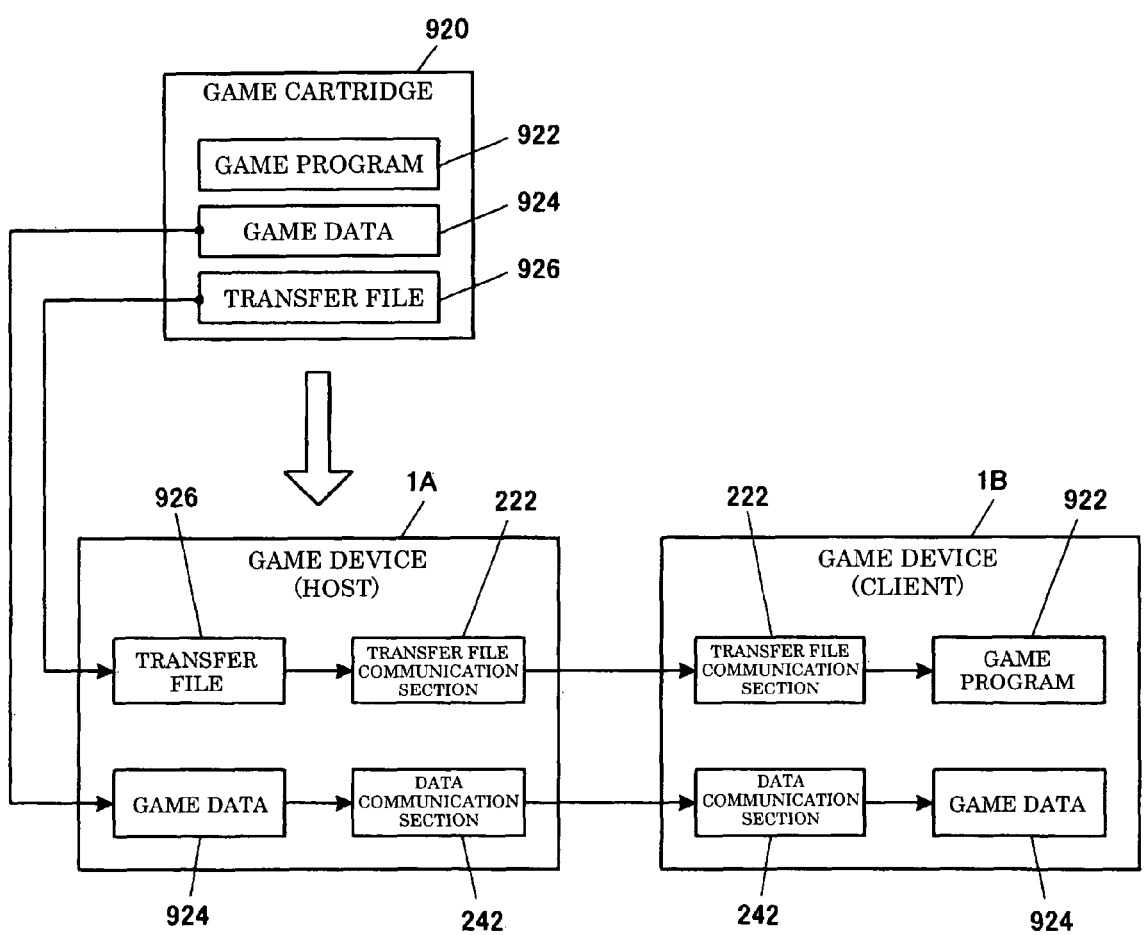
FIG. 2 is a view illustrative of a software sharing function.

FIG. 2 is a view illustrative of the software sharing function. FIG. 2 shows the case where software is shared by a portable game device 1A into which a game cartridge 920 is inserted and another portable game device 1B. The portable game device 1 which transmits the software using the software sharing function is hereinafter called a "host", and the portable game device 1 which receives the software is hereinafter called a "client". In FIG. 2, the portable game device 1A functions as the "host", and the portable game device 1B functions as the "client".

In FIG. 2, a game program 922 and game data 924 for executing the game and a transfer file 926 for sharing the software are stored in the game cartridge 920.

The transfer file 926 is a file which is transferred to the client and in which the game program 922 (game software) is converted into a transfer file using transfer file conversion processing which converts software into a transfer file. The transfer file conversion processing includes encryption and compression. In this embodiment, the transfer file 926 is transmitted and received between the portable game devices 1 through wireless communication. Therefore, the security of the game program to be transmitted and received is ensured by encrypting the game program. Moreover, the amount of data contained in the transfer file 926 is reduced by compressing the game program, whereby the load of transmission and reception is reduced.

The host reads the transfer file 926 and the game data 924 stored in the game cartridge 920 inserted into the host, and transmits the transfer file 926 and the game data 924 to the client. Each portable game device 1 transmits and receives the transfer file 926 through a transfer file communication section 222 and transmits and receives the game data 924 through a data communication section 242. In more detail, the transfer file communication section 222 and the data communication section 242 of the host respectively transmit the transfer file 926 and the game data 924 to the client.

In the client, the transfer file communication section 222 receives the transfer file transmitted from the host and restores the original game program 922 before being converted into the transfer file. The data communication section 242 receives the game data 924 transmitted from the host. The transfer file communication section 222 restores the program from the transfer file 926 using a method corresponding to the above-mentioned transfer file conversion method. In more detail, the restoration includes decryption corresponding to the above-mentioned encryption and decompression corresponding to the above-mentioned compression.

The game program 922 and the game data 924 received by the client are stored in an internal memory of the client. This allows the client to execute the game according to the game program 922 and the game data 924.

FIG. 2 illustrates the case where the portable game device 1 into which the game cartridge 920 is inserted functions as the host, and the host reads the transfer file 926 stored in the game cartridge 920 and transmits the read transfer file 926 to the client. On the other hand, when the transfer file 926 is stored in the internal memory, the host may transmit the transfer file 926 stored in the internal memory to the client.

The transfer file 926 and the game data 924 may be transferred by means other than wireless communication. For example, the transfer file 926 and the game data 924 may be transferred through wired communication by connecting the host and the client through a communication cable or the like so that data can be transmitted and received between the host and the client.

The above is the outline of the software sharing function.

The transfer file 26 according to this embodiment is described below.

Figure 3:
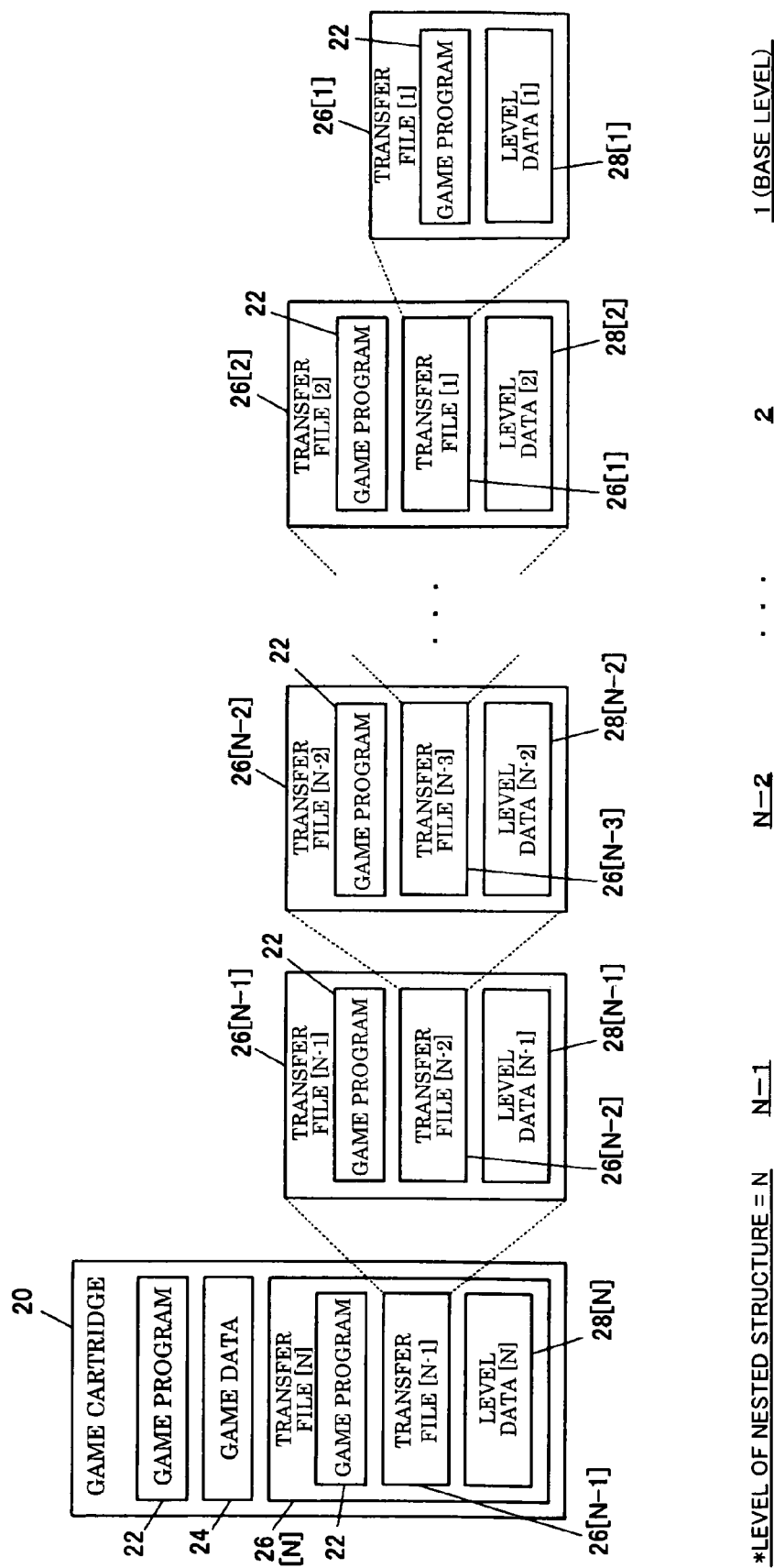
FIG. 3 is a view illustrative of a data structure of a transfer file.

FIG. 3 is a view illustrative of the data structure of the transfer file 26. In FIG. 3, the game program 22 and the game data 24 for executing the game and the transfer file 26[N] for sharing the software are stored in the game cartridge 20. The transfer file 26[N] is a file in which the game program 22 is converted into a transfer file, and has a transfer file nested structure in which the transfer file 26 is converted into a transfer file in a nested manner.

Specifically, the transfer file 26[N] is a file in which the game program 22, the transfer file 26[N−1], and level data 28[N] are collectively converted into a transfer file. The transfer file 26[N−1] is a file in which the game program 22, the transfer file 26[N−2], and the level data 28[N−1] are collectively converted into a transfer file. The transfer file 26[N−2] is a file in which the game program 22, the transfer file 26[N−3], and the level data 28[N−2] are collectively converted into a transfer file.

Likewise, the transfer file 26[n] is a file in which the game program 22, the transfer file 26[n−1], and the level data 28[n] are collectively converted into a transfer file. Note that n=N, N−1, . . . . The transfer file 26[1] is a file in which the game program 22 and the level data 28[1] are collectively converted into a transfer file.

The level data 28 is data indicating the level of the nested structure of the transfer file 26 in which the level data 28 is converted into a transfer file. The level of the nested structure is defined by a positive integer in the range from "1" to "N", such as defining the transfer file 26[1] to be the level "1" (base level), defining the transfer file 26[2] in which the transfer file 26[1] is converted into a transfer file to be the level "2" (level higher than the level "1"), and defining the transfer file 26[N] to be the level "N" (highest level).

As described above, the data structure of the transfer file 26[N] stored in the game cartridge 20 has a transfer file nested structure in which the game program 22 and the level data 28[1] are converted into a transfer file at the level "1" (base level) and the game program 22, the transfer file 26[n−1] at the level "n-1", and the level data 28[n] are converted into a transfer file at the level "n".

In the transfer file 26[N], one game program 22 is converted into a transfer file for each level of the nested structure. This means that the transfer file 26[N] substantially contains N game programs 22.

The transfer of the transfer file 26[N] having such a transfer file nested structure is using the software sharing function is described below with reference to FIG. 4.

Figure 4:
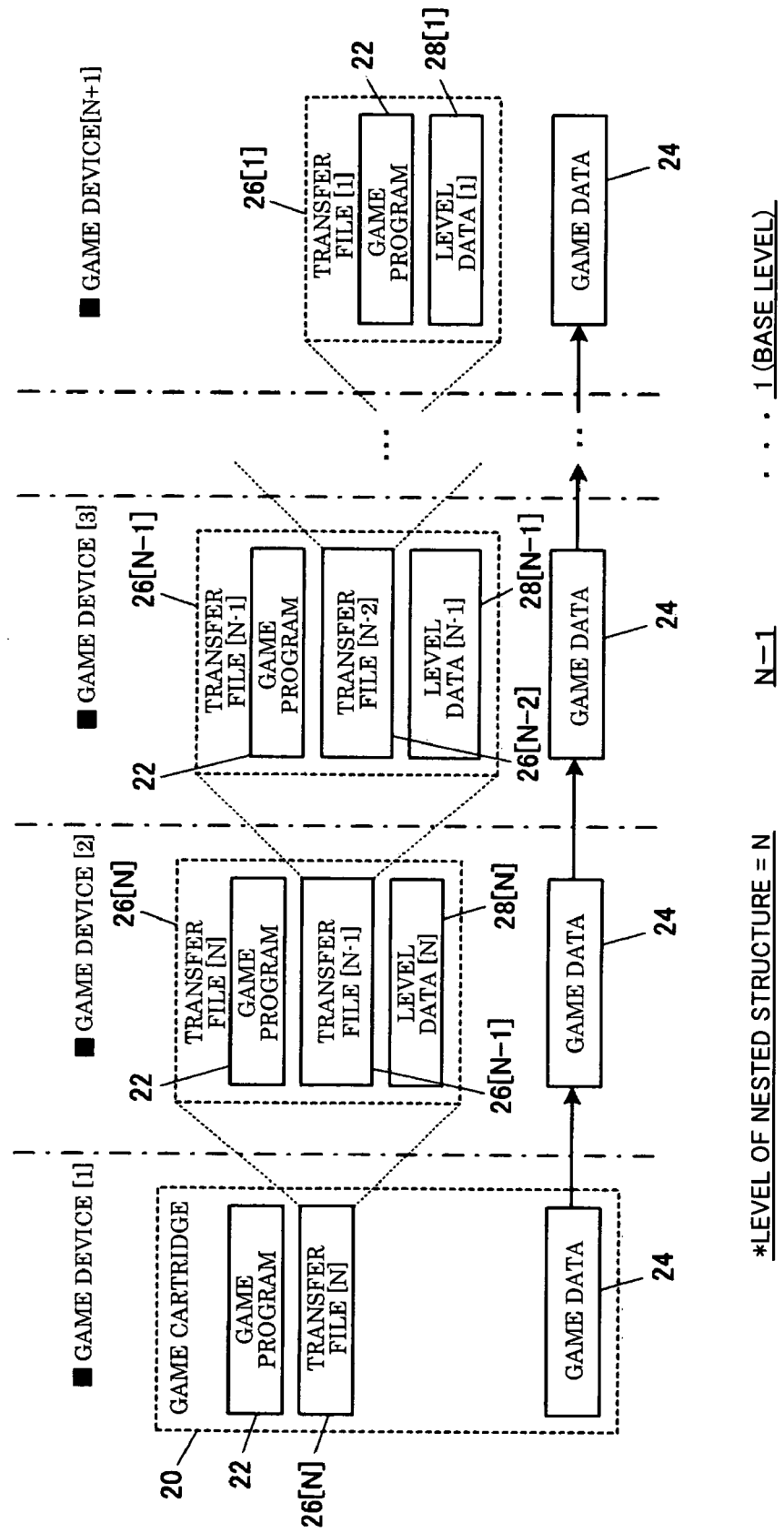
FIG. 4 is a view illustrative of transfer of a transfer file.

In FIG. 4, the transfer file 26[N] and the game data 24 stored in the game cartridge 20 inserted into the portable game device 1 (this portable game device 1 is hereinafter called "first generation game device [1]"; mth generation portable game device 1 described later is hereinafter called "game device [m]") are transmitted from the portable game device [1] to another portable game device 1. This portable game device 1 is the second generation game device [2].

As described above, the transfer file 26 is transmitted through the transfer file communication section 222, and the game data 24 is transmitted through the data communication section 242. The receiver-side portable game device 1 (client) receives the transmitted transfer file 26 and restores the information contained in the transfer file 26.

The game device [2] receives the transmitted transfer file 26[N] and restores the game program 22, the transfer file 26[N−1], and the level data 28[N]. The game device [2] also receives the game data 24. Therefore, the game device [2] can execute the game according to the game program 22 and the game data 24. The game device [2] transmits the transfer file 26[N−1] and the game data 24 to another portable game device 1. This portable game device 1 is the third generation game device [3].

The game device [3] receives the transmitted transfer file 26[N−1] and restores the game program 22, the transfer file 26[N−2], and the level data 28[N−1]. The game device [3] also receives the game data 24. Therefore, the game device [3] can execute the game according to the game program 22 and the game data 24. The game device [3] transmits the transfer file 26[N−2] and the game data 24 to still another portable game device 1. This portable game device 1 is the fourth generation game device [4].

The game device [N+1] receives the transfer file 26[1] transmitted from the game device [N] and restores the game program 22 and the level data 28[1]. The game device [N+1] also receives the game data 24. Therefore, the game device [N+1] can execute the game according to the game program 22 and the game data 24. Note that the transfer file 26 is not contained in the transfer file 26[1]. Therefore, the game device [N+1] cannot transmit the transfer file 26 to yet another portable game device 1.

As described above, the game device [1] transmits the transfer file 26[N] to the game device [2]. The mth generation game device [m] obtains the game program 22 and the transfer file 26[N−(m−1)] from the transfer file 26[N−(m−2)] transmitted from the (m−1)th generation game device [m−1], and transmits the transfer file 26[N−(m−1)] to the next generation game device [m+1]. Note that m=2, 3, . . . N. The final generation game device [N+1] obtains the game program 22 from the transfer file 26[1] transmitted from the game device [N].

The transfer file 26[N] having such a nested structure allows the software to be shared among the first generation game device to the (N+1)th generation game device [N+1]. That is, the software can be shared over (N+1) generations. The maximum number of times that the transfer file can be transferred over generations by software sharing is called an intergeneration transferable count. In FIG. 4, the intergeneration transferable count is "N".

The intergeneration transferable count of the transfer file 26[1] stored in the game cartridge 20 is mainly determined by the size of the game program 22 to be transferred and the maximum allowable size of the transfer file 26. The maximum allowable size of the transfer file 26 is specified by the memory capacity when the transfer file 26 is stored in the portable game device 1, for example. The size of the game program 22 compressed when converted into a transfer file is indicated by "a", and the maximum allowable size of the transfer file 26 is indicated by "b". The transfer file 26[N] substantially contains N game programs 22 in a compressed state, as described above. Therefore, the intergeneration transferable count "N" is a value which satisfies "a×N≦b".

Functional Configuration of Portable Game Device

Figure 5:
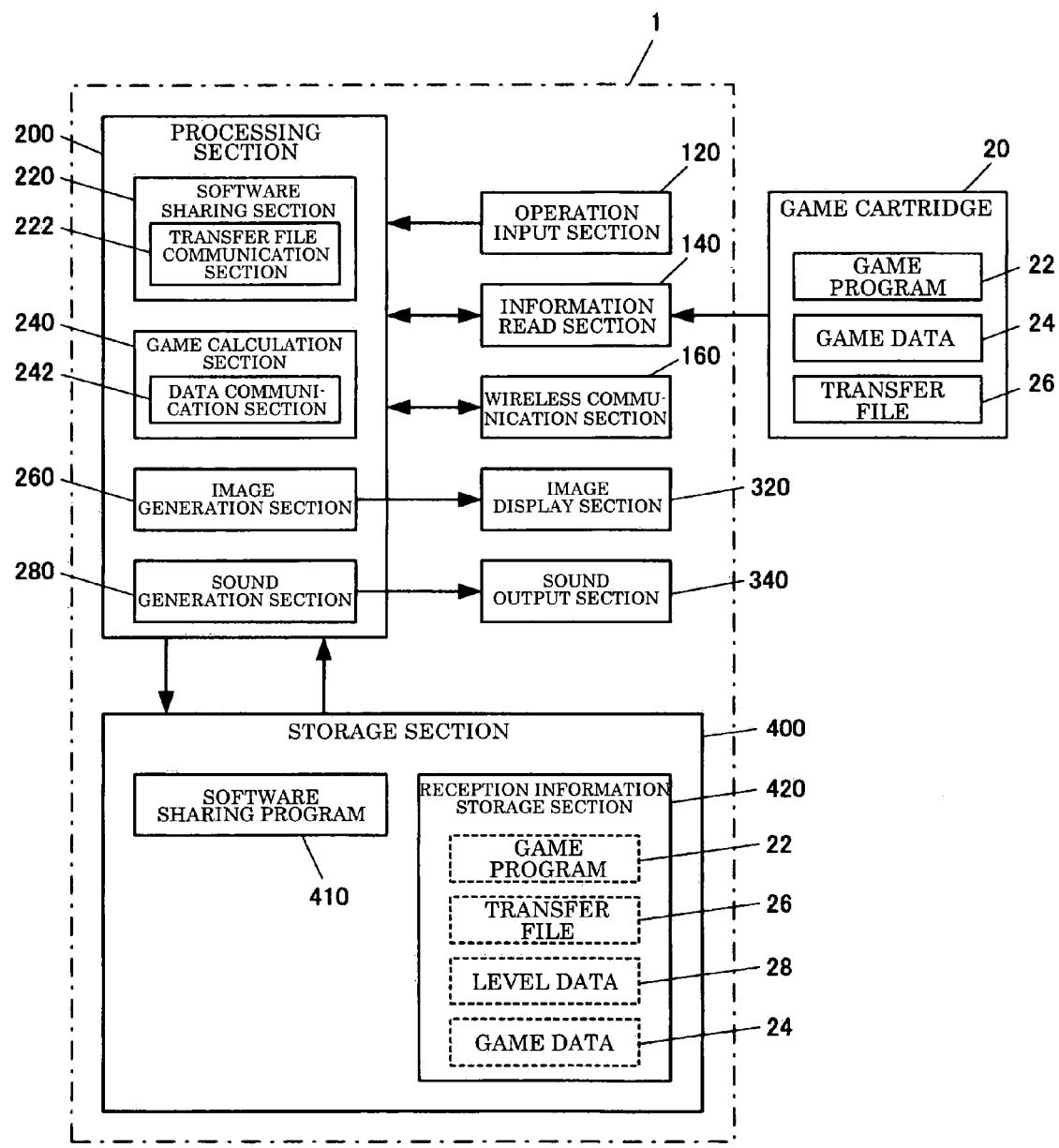
FIG. 5 is a functional configuration diagram of a portable game device.

FIG. 5 is a block diagram showing a functional configuration of the portable game device 1. In FIG. 5, the portable game device 1 is functionally configured to include an operation input section 120, an information read section 140, a wireless communication section 160, a processing section 200, an image display section 320, a sound output section 340, and a storage section 400.

The operation input section 120 receives operation instructions from the user, and outputs operation signals corresponding to the operation to the processing section 200. In FIG. 1, the direction key 3, button switches 5, power supply switch, and volume control switch (not shown) correspond to the operation input section 120.

The information read section 140 reads information from the game cartridge 20 which is an information storage medium, and outputs the read information to the processing section 200. In FIG. 1, the read device provided in the housing corresponds to the information read section 140.

The wireless communication section 160 mainly communicates with an external instrument such as another portable game device 1, and transmits and receives data to and from the external instrument. This function is implemented by a wireless communication module conforming to a wireless communication standard such as wireless LAN, IrDA, or BlueTooth(registered trademark). In FIG. 1, the wireless communication device 15 provided in the housing corresponds to the wireless communication section 160.

The processing section 200 performs various calculations such as controlling the entire portable game device 1, proceeding with the game, software sharing, and communication and generating an image and sound. This function is implemented by a processing unit such as a CPU (CISC or RISC) or an ASIC (e.g. gate array) and its control program, for example. In FIG. 1, the CPU provided in the control device 13 corresponds to the processing section 200.

In this embodiment, the processing section 200 includes a software sharing section 220 which performs software sharing calculations, a game calculation section 240 which mainly performs game calculations, an image generation section 260 which generates image signals for various display screens based on various types of data calculated by the processing of the software sharing section 220 and the game calculation section 240, and a sound generation section 280 which generates sound signals for various types of sound such as effect sound and background music (BGM).

The software sharing section 220 includes a transfer file communication section 222 which controls transmission and reception of the transfer file 26 to and from another portable game device 1, and performs software sharing processing according to a software sharing program 410.

In more detail, the software sharing section 220 determines whether the portable game device 1 is the host or the client based on whether or not the game cartridge 20 has been inserted, whether or not the transfer file 26 has been stored in a reception information storage section 420, the operation signals from the operation input section 120, and the like. The portable game device 1 is determined to be the host when at least one of the conditions (1) the game cartridge 20 has been inserted and (2) the transfer file 26 has been stored in the reception information storage section 420 is satisfied.

When the portable game device 1 has been determined to be the host, the transfer file communication section 222 transmits to the client the transfer file 26 stored in the game cartridge 20 inserted into the portable game device 1 or the transfer file 26 stored in the reception information storage section 420.

When the portable game device 1 has been determined to be the client, the transfer file communication section 222 receives the transfer file 26 transmitted from the host and restores the information contained in the transfer file 26. The restored information (game program 22, transfer file 26, and level data 28) is stored in the reception information storage section 420. The software sharing section 220 determines whether or not to execute the restored game program 22 based on the operation signals from the operation input section 120 and the like. When the software sharing section 220 has determined that the game program 22 is to be executed, the software sharing section 220 causes the game calculation section 240 to execute game processing according to the restored game program 22.

The game calculation section 240 includes a data communication section 242 which controls transmission and reception of the game data 24 to and from another portable game device 1, and executes game processing according to the game program 22 stored in the game cartridge 20 or the game program 22 stored in the reception information storage section 420.

In more detail, the game calculation section 240 determines the presence or absence of the game data 24 which is execution reference data necessary for executing the game which is the main processing of the game program 22. Specifically, when the game calculation section 240 has executed the game program 22 stored in the game cartridge 20, the game calculation section 240 determines that the game data 24 is present since the game data 24 stored in the game cartridge 20 is used. On the other hand, when the game calculation section 240 has executed the game program 22 stored in the reception information storage section 420, the game calculation section 240 determines whether or not the game data 24 is stored in the reception information storage section 420.

When the game calculation section 240 has determined that the game data 24 is stored in the reception information storage section 420, the game calculation section 240 executes the game using the game data 24 stored in the reception information storage section 420. When the game calculation section 240 has determined that the game data 24 is not stored in the reception information storage section 420, the game calculation section 240 establishes one-to-one communication with the portable game device 1 as the host through the wireless communication section 160, and the data communication section 242 receives the game data 24 transmitted from the host. In this case, the host refers to the portable game device 1 which has transmitted the game program 22. The received game data 24 is stored in the reception information storage section 420. The game calculation section 240 then executes the game using the received game data 24.

The image generation section 260 generates a display image for displaying a display screen such as a game screen based on the calculation results obtained by the software sharing section 220 and the game calculation section 240, and outputs the image signals of the generated image to the image display section 320.

The image display section 320 displays the display screen based on the image signals from the image generation section 260 while redrawing the image of one frame every 1/60 second, for example. This function is implemented by an LCD, ELD, PDP, HMD, or the like. In FIG. 1, the display 7 corresponds to the image display section 320.

The sound generation section 280 generates various types of sound such as effect sound and BGM based on the calculation results obtained by the software sharing section 220 and the game calculation section 240, and outputs the sound signals of the generated sound to the sound output section 340.

The sound output section 340 outputs various types of sound such as effect sound and BGM based on the sound signals from the sound generation section 280. This function is implemented by a speaker or the like. In FIG. 1, the speaker 9 corresponds to the sound output section 340.

The storage section 400 stores a system program for implementing various functions for causing the processing section 200 to integrally control the portable game device 1, a program and data necessary for causing the processing section 200 to execute various applications such as game and software sharing applications, and the like, and is used as a work area for the processing section 200. The storage section 400 temporarily stores the results of calculations performed by the processing section 200 according to various programs, operation signals and data input from the operation input section 120, and the like. This function is implemented by various IC memories, hard disk, MO, RAM, VRAM, or the like. In FIG. 1, the IC memory provided in the control device 13 corresponds to the storage section 400.

In this embodiment, the storage section 400 stores the software sharing program 410 for causing the processing section 200 to function as the software sharing section 220, and includes the reception information storage section 420. The reception information storage section 420 stores information received from another portable game devices 1 as the host based on the software sharing function. In more detail, the reception information storage section 420 stores the game program 22, the transfer file 26, and the level data 28 received and restored by the transfer file communication section 222, and the game data 24 received by the data communication section 242.

Flow of Processing of Portable Game Device

Figure 6:
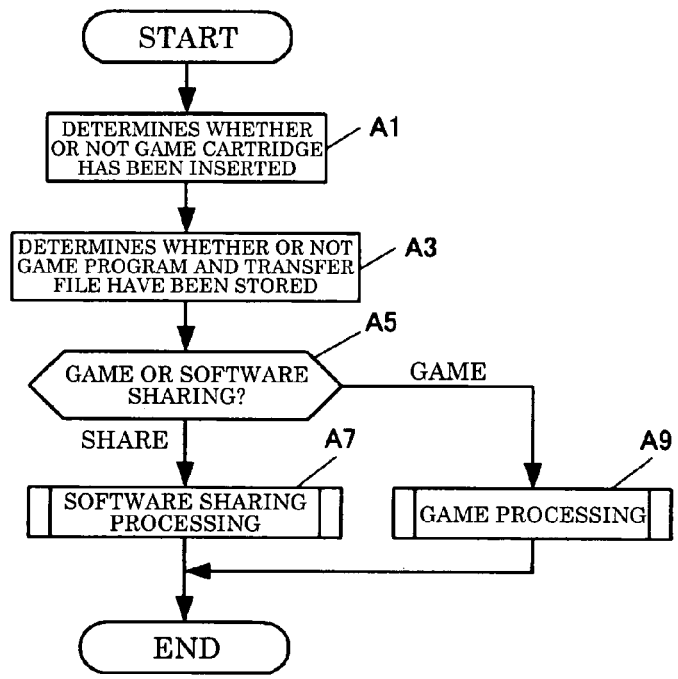
FIG. 6 is a flow diagram of the entire processing of a portable game device.

FIG. 6 is a flowchart illustrative of the flow of the entire processing of the portable game device 1. In FIG. 6, the processing section 200 determines whether or not the game cartridge 20 has been inserted (presence or absence of insertion) (step A1). The processing section 200 determines whether or not the game program 22 and the transfer file 26 have been stored in the reception information storage section 420 (presence or absence of storage) (step A3).

The processing section 200 then determines whether to execute the game or the software sharing processing based on the determination results of the presence or absence of insertion and the presence or absence of storage, the operation signals from the operation input section 120, and the like. When the processing section 200 has determined that the software sharing processing is to be executed ("share" in step A5), the software sharing section 220 executes the software sharing processing (step A7). When the processing section 200 has determined that the game is to be executed ("game" in step A5), the game calculation section 240 executes the game processing (step A9). When each processing step has been completed, the entire processing is completed.

Figure 7:
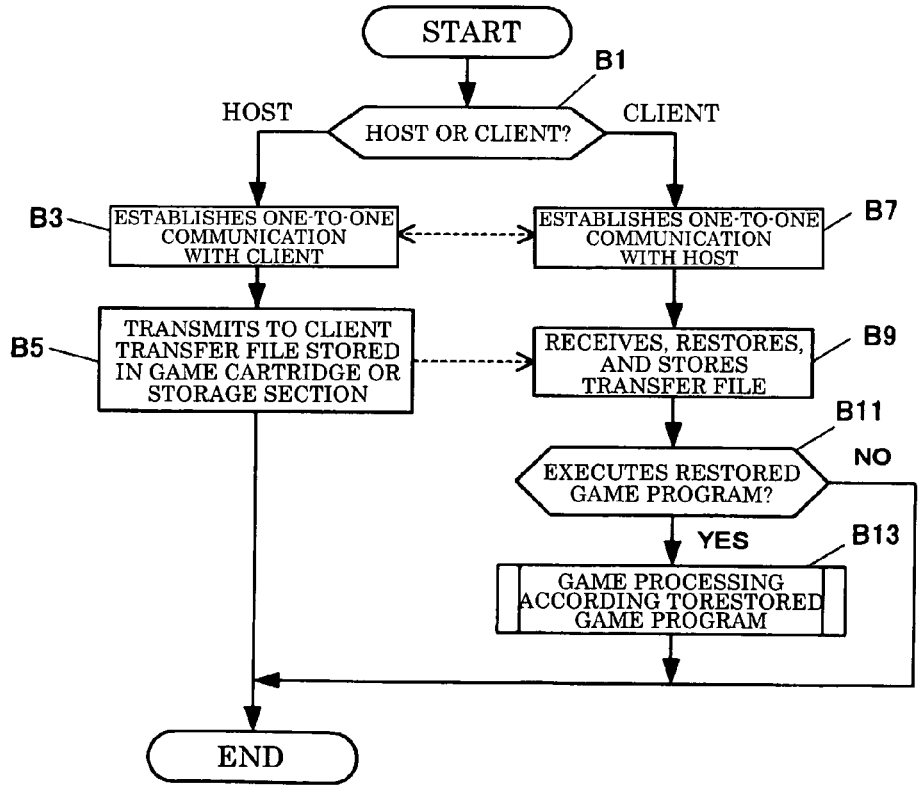
FIG. 7 is a flow diagram of software sharing processing performed during the entire processing.

FIG. 7 is a flowchart illustrative of the flow of the software sharing processing. The software sharing processing is implemented by causing the software sharing section 220 to execute the software sharing program 410. In FIG. 7, the software sharing section 220 determines whether the portable game device 1 is the host or the client based on whether or not the game cartridge 20 has been inserted, whether or not the transfer file 26 has been stored, the operation signals from the operation input section 120, and the like.

When the software sharing section 220 has determined that the portable game device 1 is the host ("host" in step B1), the software sharing section 220 performs the following processing. Specifically, the software sharing section 220 establishes one-to-one communication with another portable game device 1 as the client through the wireless communication section 160 (step B3). The transfer file communication section 222 then transmits to the client the transfer file 26 stored in the game cartridge 20 inserted into the portable game device 1 or the transfer file 26 stored in the reception information storage section 420 (step B5).

On the other hand, when the software sharing section 220 has determined that the portable game device 1 is the client ("client" in step B1), the software sharing section 220 perform the following processing. Specifically, the software sharing section 220 establishes one-to-one communication with another portable game device 1 as the host through the wireless communication section 160 (step B7). The transfer file communication section 222 then receives the transfer file transmitted from the host, restores the information contained in the transfer file, and stores the resulting information (game program 22, transfer file 26, and level data 28) in the reception information storage section 420 (step B9).

The software sharing section 220 then determines whether or not to execute the restored game program 22 based on the operation signals from the operation input section 120, for example. When the software sharing section 220 has determined that the restored game program 22 is to be executed ("YES" in step B11), the software sharing section 220 causes the game calculation section 240 to execute game processing according to the restored game program 22 (step B13).

When the above processing has been completed, the software sharing processing is completed.

Figure 8:
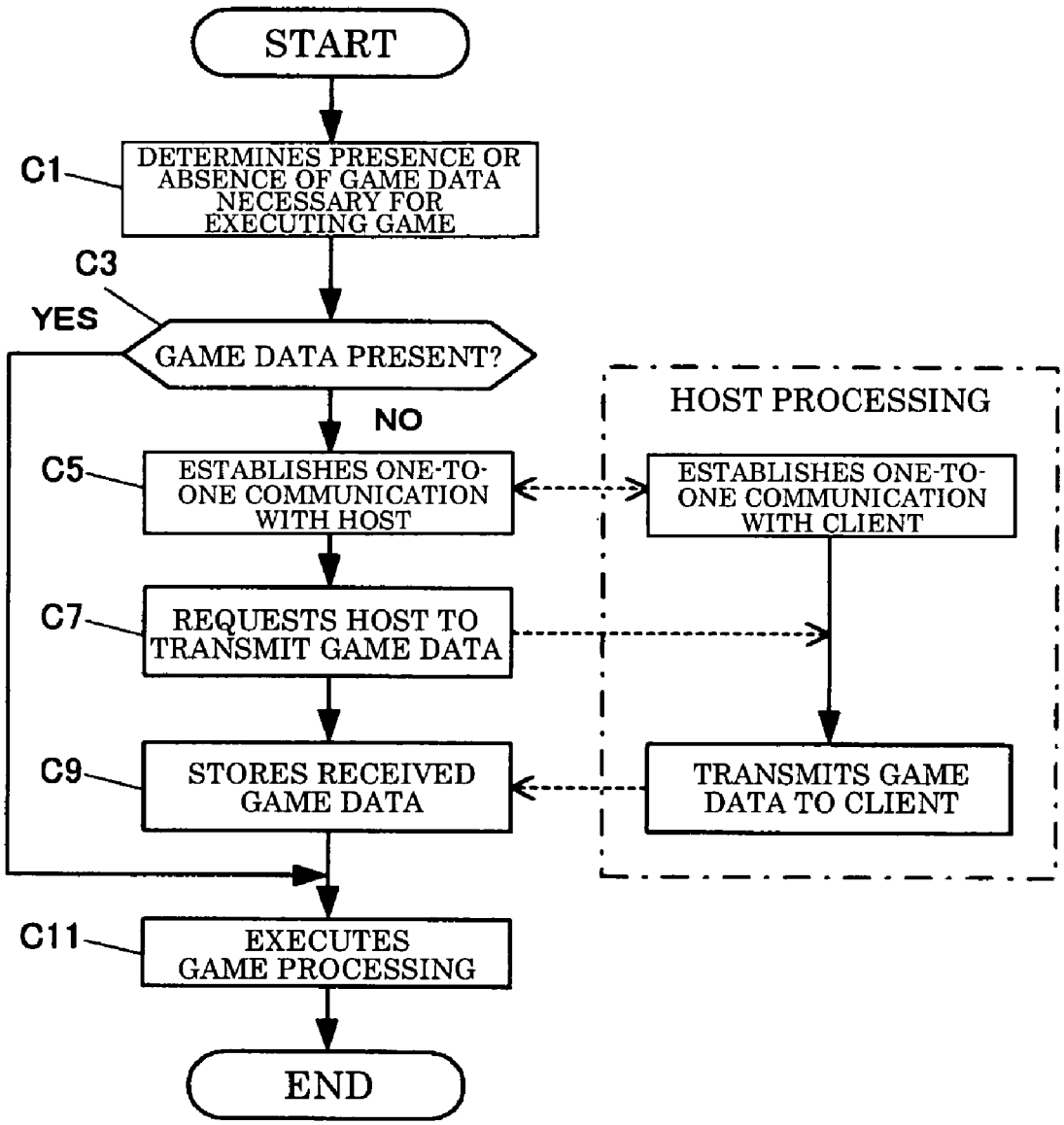
FIG. 8 is a flow diagram of game processing performed during the entire processing.

FIG. 8 is a flowchart illustrative of the flow of the game processing. The game processing is implemented by causing the game calculation section 240 to execute the game program 22 stored in the game cartridge 20 or the game program 22 stored in the reception information storage section 420.

In FIG. 8, the game calculation section 240 determines the presence or absence of the game data 24 necessary for executing the game according to the game program 22 based on whether or not the game cartridge 20 has been inserted, whether or not the game data 24 has been stored, and the like (step C1). When the game calculation section 240 has determined that the game data 24 is present ("YES" in step C3), the game calculation section 240 executes the game using the game data 24 (step C11).

On the other hand, when the game calculation section 240 has determined that the game data 24 is absent ("NO" in step C3), the game calculation section 240 establishes one-to-one communication with another portable game device 1 as the host through the wireless communication section 160 (step C5). The game calculation section 240 then requests the host to transmit the game data 24 (step C7). The data communication section 242 receives the game data 24 transmitted from the host, and stores the received game data 24 in the reception information storage section 420 (step C9). The game calculation section 240 then executes the game using the received game data 24 (step C11).

When the above processing has been completed, the game processing is completed.

Generation of Transfer File

Generation of the transfer file 26 stored in the game cartridge 20 (hereinafter called "storage transfer file") is described below. The transfer file 26 is generated by the manufacturer of the game cartridge 20.

Figure 9:
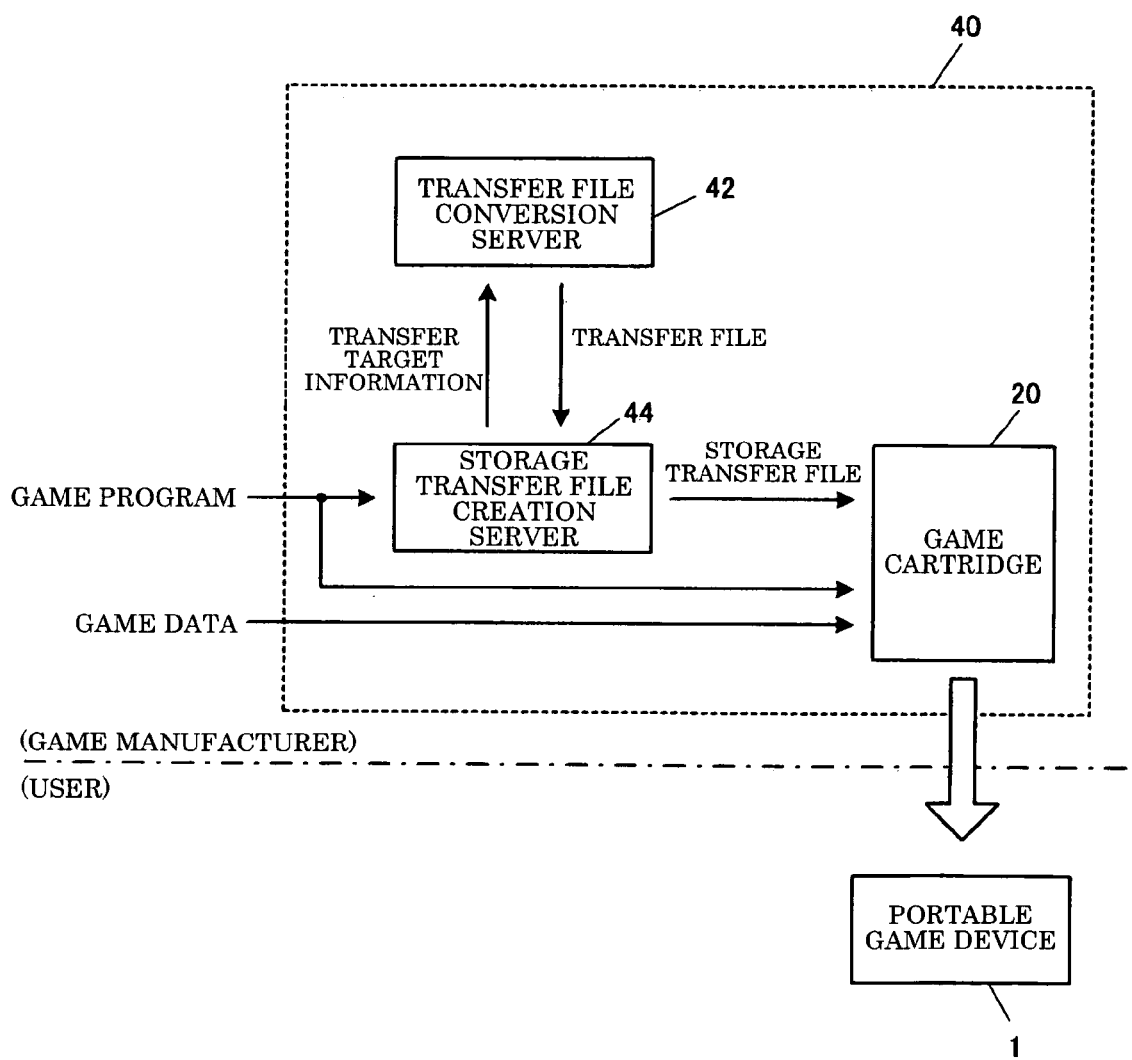
FIG. 9 is a configuration diagram of a storage transfer file generation system.

FIG. 9 is a view showing the entire configuration of a generation system 40 for generating the storage transfer file. The generation system 40 includes a transfer file conversion server 42 and a storage transfer file creation server 44, and generates the storage transfer file from the given game program 22. The generation system 40 is provided and managed by the game manufacturer, for example.

The transfer file conversion server 42 performs transfer file conversion processing including converting transfer target information from the storage transfer file creation server 44 into a transfer file. The transfer file conversion processing includes encryption and compression, as described above.

The storage transfer file creation server 44 repeatedly performs processing including generating the transfer target information based on the given game program 22, the transfer file 26 converted by the transfer file conversion server 42, and the like, and causing the transfer file conversion server 42 to convert the transfer target information into a transfer file to create the storage transfer file. The storage transfer file created by the storage transfer file creation server 44 is stored in the game cartridge 20 together with the game program 22 and the game data 24, and sold as a product or distributed free of charge, for example.

Figure 10:
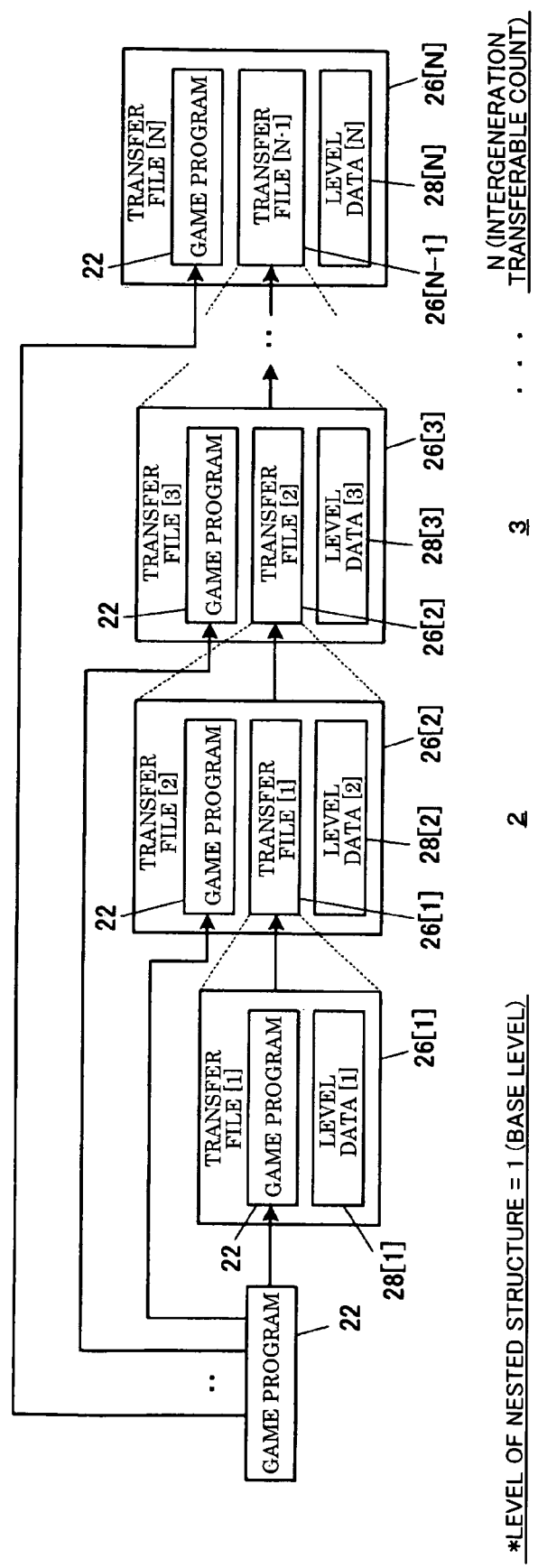
FIG. 10 is a view illustrative of generation of a storage transfer file.

FIG. 10 is a view illustrative of the storage transfer file generation method of the generation system 40. Note that the intergeneration transferable count is "N". In FIG. 10, the storage transfer file creation server 44 creates the transfer target information containing the game program 22 and the level data 28[1] of which the level is set at the base level "1", and the transfer file conversion server 42 converts the transfer target information into the transfer file 26[1].

The storage transfer file creation server 44 then creates the transfer target information containing the transfer file 26[1], the game program 22, and the level data 28[2] of which the level is set at "2", and the transfer file conversion server 42 converts the transfer target information into the transfer file 26[2]. The storage transfer file creation server 44 then creates the transfer target information containing the transfer file 26[2], the game program 22, and the level data 28[3] of which the level is set at "3", and the transfer file conversion server 42 converts the transfer target information into the transfer file 26[3].

The storage transfer file creation server 44 similarly creates the transfer files. In the final stage, the storage transfer file creation server 44 creates the transfer target information containing the transfer file 26[N−1], the game program 22, and the level data 28[N] of which the level is set at "N", and the transfer file conversion server 42 converts the transfer target information into the transfer file 26[N]. The transfer file 26[N] is the storage transfer file.

As described above, the processing including creating the transfer target information containing the transfer file 26 converted in the preceding stage, the game program 22, and the level data 28 and converting the transfer target information into the transfer file 26 is repeatedly performed a number of times equal to the intergeneration transferable count, whereby the transfer file 26 as the storage transfer file is generated.

Figure 11:
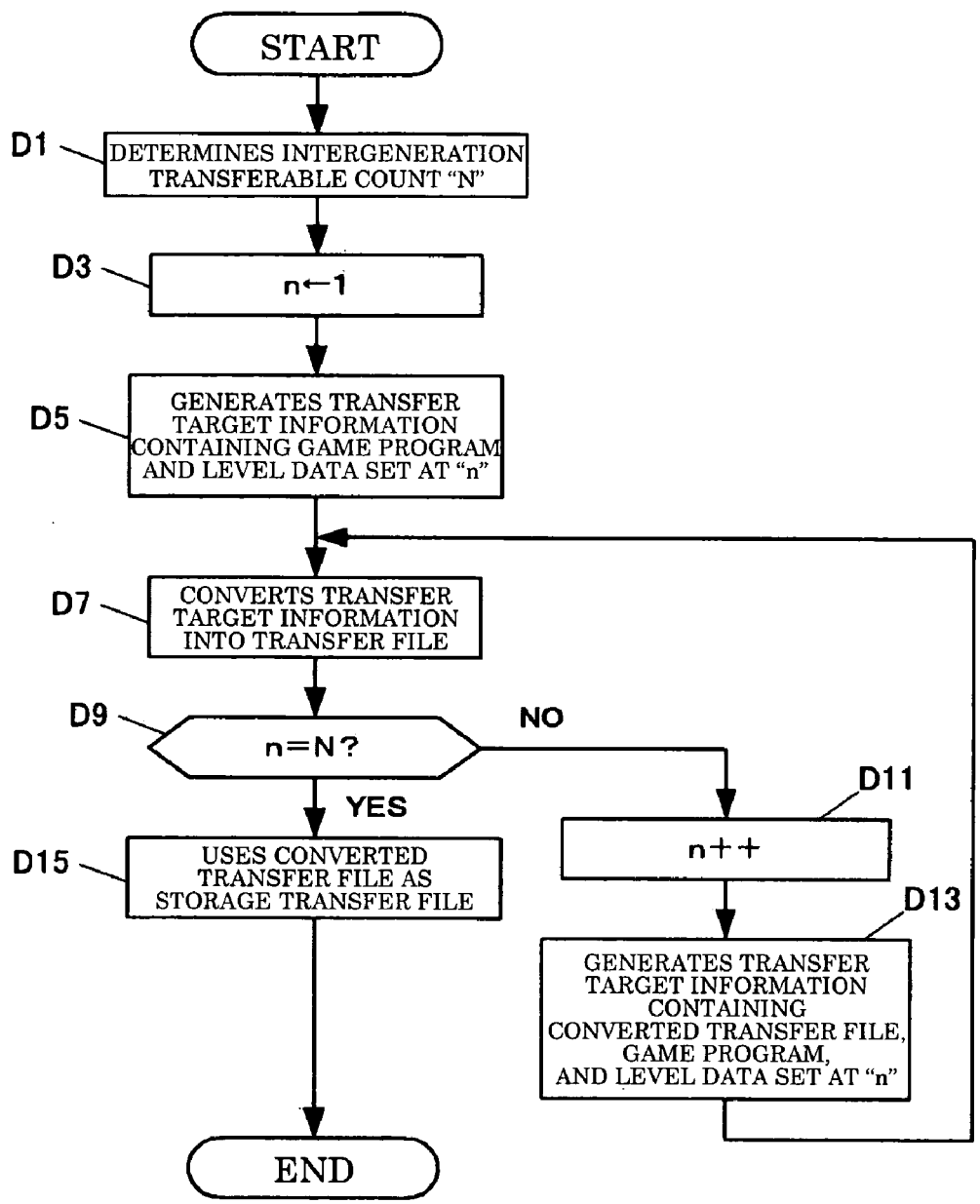
FIG. 11 is a flow diagram of storage transfer file creation processing.

FIG. 11 is a flowchart illustrative of the flow of the storage transfer file creation processing performed by the storage transfer file creation server 44. In FIG. 11, the storage transfer file creation server 44 first determines the intergeneration transferable count "N" (step D1). The storage transfer file creation server 44 sets the variable "n" indicating the level of the nested structure at the base level "1" (step D3).

The storage transfer file creation server 44 generates the transfer target information containing the given game program 22 and the level data 28 of which the level is set at "n" (step D5), and causes the transfer file conversion server 42 to convert the transfer target information into the transfer file 26 by the transfer file conversion processing (step D7).

The storage transfer file creation server 44 then determines whether or not the variable "n" coincides with the intergeneration transferable count "N". When the storage transfer file creation server 44 has determined that the variable "n" does not coincide with the intergeneration transferable count "N" ("NO" in step D9), the storage transfer file creation server 44 increments the variable "n" by "1" (step D11. The storage transfer file creation server 44 generates the transfer target information containing the transfer file converted in the step D7 and the level data 28 of which the level is set at "n" (step D13), and causes the transfer file conversion server 42 to convert the transfer target information into a transfer file by the transfer file conversion processing (step D7).

On the other hand, when the storage transfer file creation server 44 has determined that the variable "n" coincides with the intergeneration transferable count "N" in the in step D9

("YES" in step D9), the storage transfer file creation server 44 uses the transfer file converted in the step D7 as the storage transfer file (step D15) to complete the storage transfer file generation processing.

Effects

According to this embodiment, the transfer file 26 stored in the game cartridge 20 has the transfer file nested structure in which the transfer file 26 in which the game program 22 is converted into a transfer file is further converted into a transfer file. Specifically, the data restored by the portable game device 1 from the data received from the portable game device 1 as the host into which the game cartridge 20 is inserted is also the transfer file 26 having the transfer file nested structure. Therefore, the restored transfer file 26 can be transferred to still another portable game device 1. This allows the transfer file 26 to be transferred over three or more generations.

Moreover, the game program 22 is converted into a transfer file at the level "1" (base level) of the nested structure, and the transfer file 26[n−1] converted at the level "n−1" and the game program 22 are converted into a transfer file at the level "n" higher than the level "1". Therefore, the game program 22 can be executed in each generation to which the transfer file 26 is transferred.

Modification

The embodiments to which the invention may be applied are not limited to the above-described embodiments. Various modifications and variations may be made within the spirit and scope of the invention.

(A) The above-described embodiments illustrate the case where the game program 22 is identical at each level of the transfer file nested structure and the game data 24 used when executing the game program 22 is also identical. Note that the following modifications are also possible.

(A-1) For example, a modification is possible in which the game program 22 is identical and the game data 24 used when executing the game program 22 differs corresponding to the level of the nested structure.

Figure 12:
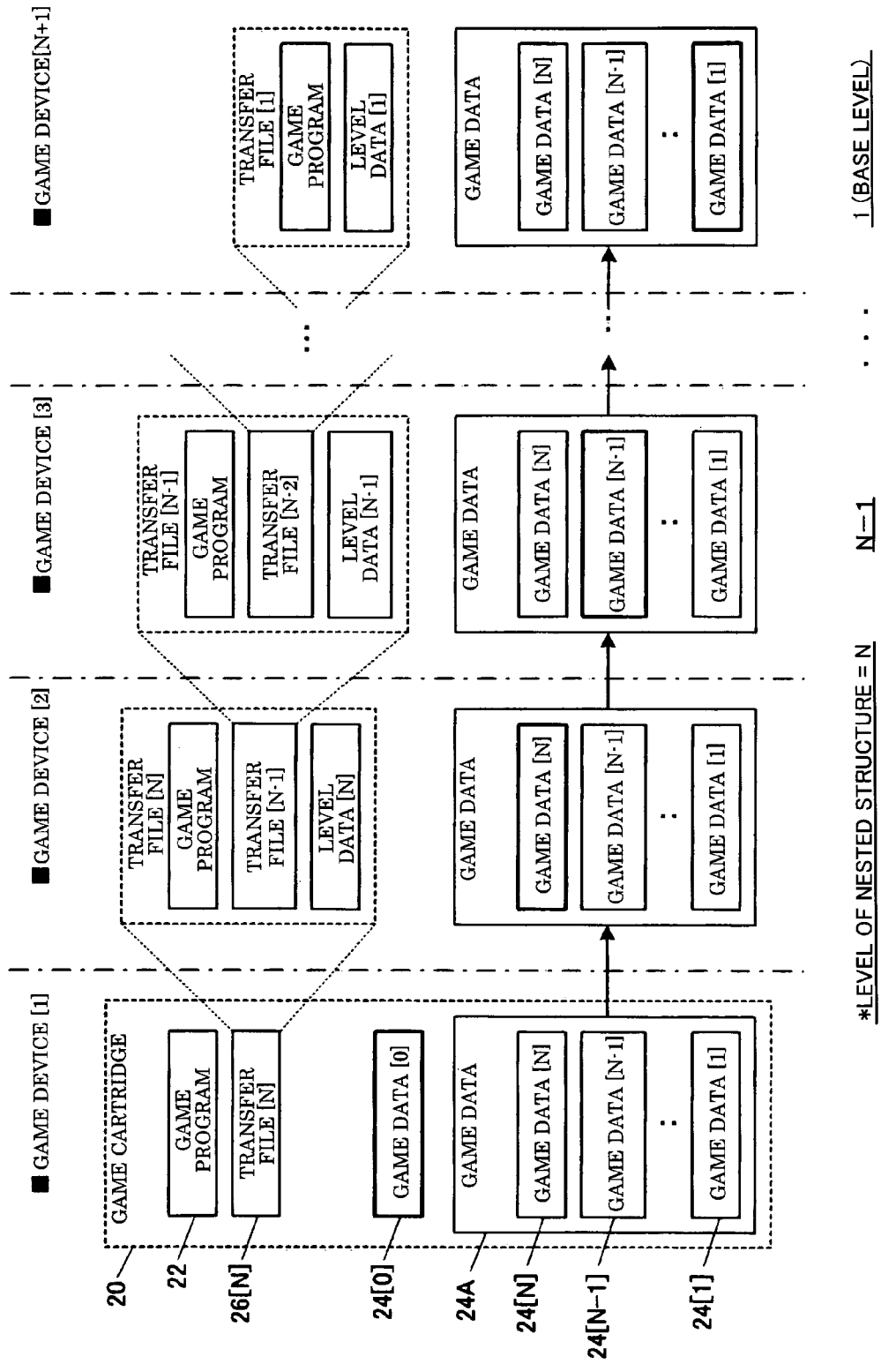
FIG. 12 is a modification of a data structure of a transfer file.

Specifically, as shown in FIG. 12, the game data 24[0] used for the first generation portable game device 1 when executing the game program 22 and the game data 24A transferred to each portable game device 1 in the second or subsequent generation are stored in the game cartridge 20. The game data 24A includes the game data 24[1] to 24[N] respectively corresponding to the levels "1" to "N" of the nested structure.

Each of the game devices [2] to [N+1] in the second or subsequent generation selectively uses one piece of the game data 24[N] to 24[1] from the received game data 24A corresponding to the level of the nested structure when executing the game program 22. The game devices [2] to [N+1] can determine the level of the nested structure from the level data 28[N] to 28[1].

The game data 24[1] to 24[N] corresponds to the game program 22, but differs from the others. In more detail, (a) each piece of the game data 24[1] to 24[N] may differ from the others in character information such as a character (e.g. player's character or enemy character) which appears in the game or model data, texture, or capability parameter of the character, or (b) each piece of the game data 24[1] to 24[N] may differ from the others in game stage information such as a game stage including the background, game conditions such as the weather, or game clear conditions, for example. Therefore, the users of the portable game devices 1 in different generations can enjoy the games which differ in the characters appearing in the game or differ in the game stages.

(A-2) A modification is also possible in which the game data 24 is identical and the game program 22 converted into a transfer file differs corresponding to the level of the nested structure. This allows the users of the portable game devices 1 in different generations to enjoy different games, such as allowing the user of the portable game device 1 in one generation to play a baseball game and allowing the user of the portable game device 1 in another generation to play a soccer game.

Figure 13:
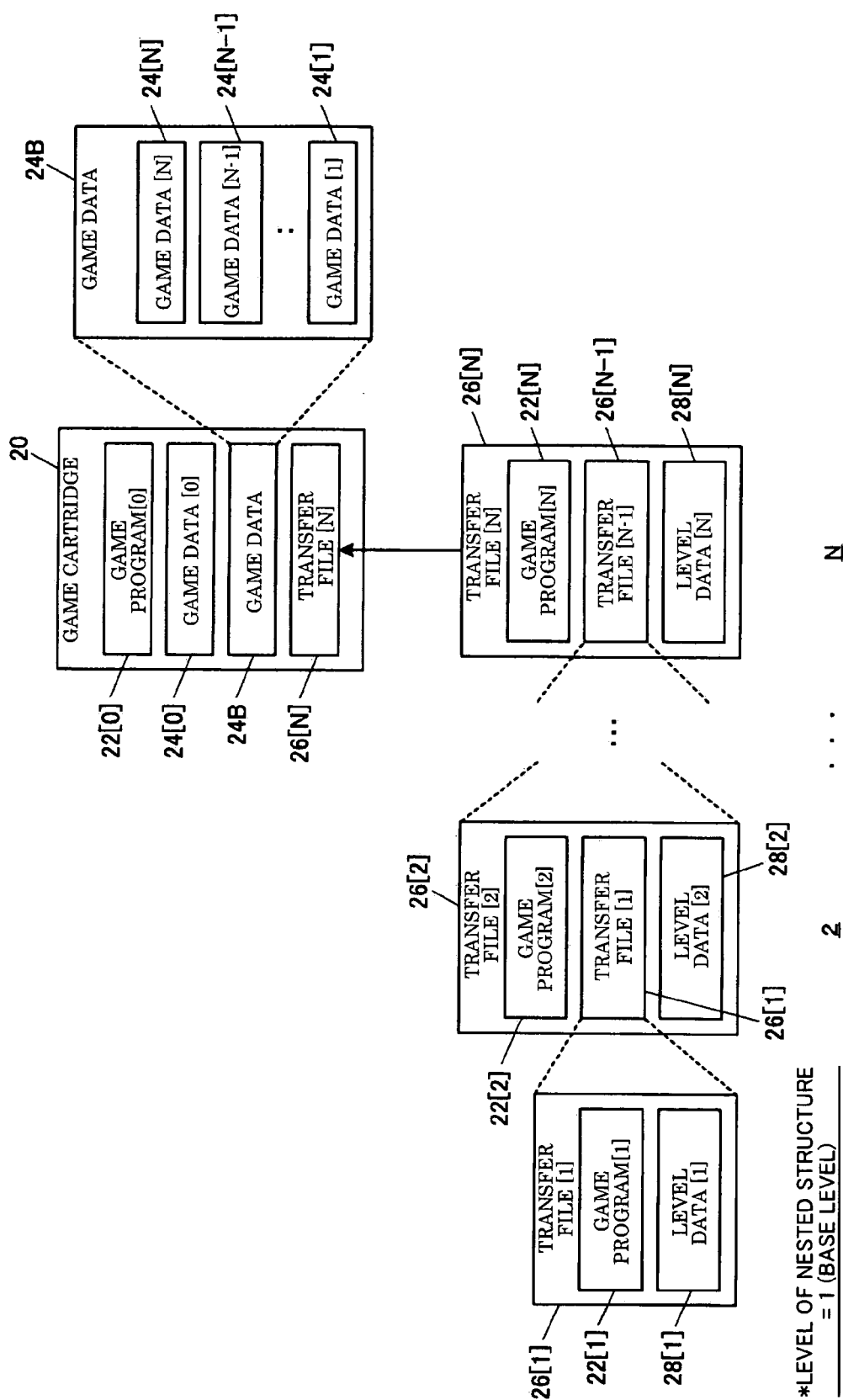
FIG. 13 is another modification of a data structure of a transfer file.

(A-3) A modification is also possible in which the game program 22 converted into a transfer file and the game data 24 used when executing the game program 22 differ corresponding to the level of the nested structure. In more detail, as shown in FIG. 13, the game programs 22[1] to 22[N] are respectively converted into transfer files at the levels "1" to "N" of the nested structure. The game data 24B including the game data 24[1] to 24[N] respectively corresponding to the game programs 22[1] to 22[N] is stored in the game cartridge 20. The game data 24[1] to 24[N] is respectively associated with the levels "1" to "N" of the nested structure.

(B) The above-described embodiments illustrate the case where the transfer file 26 is generated by converting the game program 22 into a transfer file. Note that the game program 22 and the game data 24 may be collectively converted into a transfer file.

Figure 14:
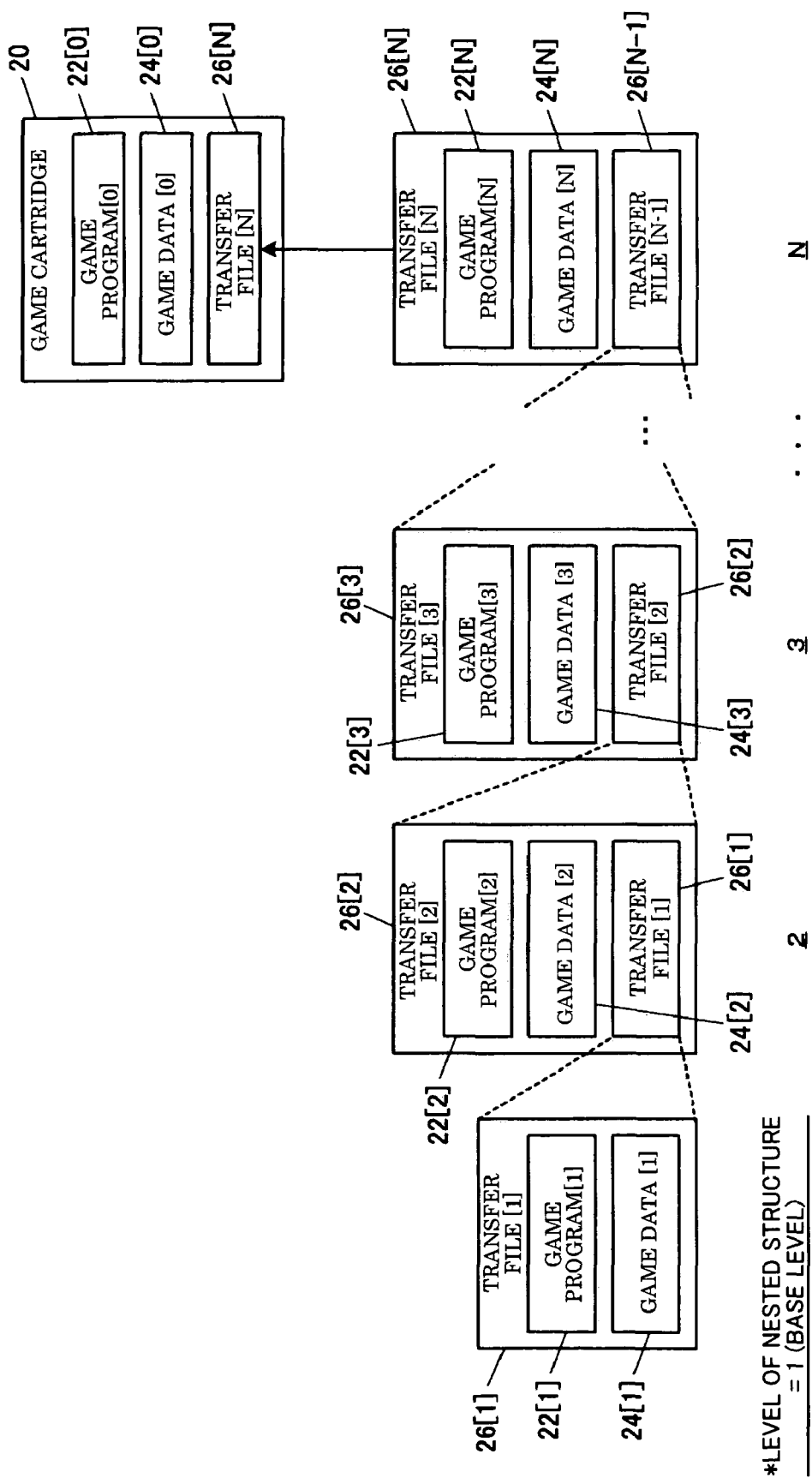
FIG. 14 is yet another modification of a data structure of a transfer file.

Specifically, as shown in FIG. 14, the game programs 22[1] to 22[N] and the game data 24[1] to 24[N] used when executing the game programs 22[1] to 22[N] may be collectively converted into a transfer files at each of the levels "1" to "N" of the nested structure, respectively. The generated transfer file 26[N] is stored in the game cartridge 20 together with the game program 22[0] executed by the game device [1] and the game data 24[0].

This makes it unnecessary for each portable game device 1 to receive the corresponding game data 24 from the host when executing the restored game program 22 for the first time, differing from the above-described embodiments. However, since the transfer file 26 has the maximum allowable size, the intergeneration transferable count "N" is reduced in comparison with the case where the game data 24 is not converted into a transfer file.

(C) In the above-described embodiments, when the game data 24 necessary for executing the game according to the restored game program 22 has not been received when executing the game program 22, the game data 24 is received from the host. Note that whether or not to receive the game data 24 may be determined depending on the free space in the reception information storage section 420 which is the internal memory of the portable game device 1.

In more detail, the game data 24 is received when the size of the game data 24 to be received is equal to or less than the free space in the reception information storage section 420. The host may store a plurality of pieces of game data 24 having different sizes, and the client may selectively receive the game data 24 having a size equal to or less than the free space in the reception information storage section 420.

(D) Each portable game device 1 may manage succession history information which is transfer history information of the transfer file 26 transferred between the portable game devices 1. The succession history information is information indicating the portable game devices 1 between which specific transfer file 26 stored in the game cartridge 20 has been transferred (succeeded). The succession information has a hierarchical data structure based on the generation of each portable game device 1, for example.

In more detail, the host transmits the succession history information and device identification information such as the device ID and the name of user of the host to the client when the host transmits the transfer file 26 to the client (e.g. step subsequent to the step B5 in FIG. 7), and the client transmits the device identification information of the client to the host (e.g. step subsequent to the step B9 in FIG. 7). The host adds the received device identification information of the client to the succession history information in the layer immediately under the layer of the host to update the succession history information, and the client adds the received device identification information of the host to the succession history information in the layer immediately under the layer of the client to update the succession history information. The succession history information may be transmitted and updated when executing the restored game program 22 instead of when transmitting the transfer file 26. In more detail, the succession history information may be transmitted and updated when transmitting the game data 24 (e.g. step subsequent to the step C9 in FIG. 8).

The client establishes wireless communication with another portable game device 1 excluding the host located within the communication range, and transmits and receives the device identification information to and from the other portable game device 1. When the received device identification information of the other portable game device 1 is included in the succession history information of the client, the client transmits and receives the succession history information to and from the other portable game device 1, and updates the succession history information of the client based on the received succession history information.

Each portable game device 1 may display the transfer history of the transfer file 26 based on the succession history information. In more detail, the portable game device 1 may display the generation number of the portable game device 1, or may display a genealogical chart in which the name of the user of the portable game device 1 in each generation subsequent to the host is indicated in the transfer order of the transfer file 26, for example.

(E) Execution of the restored game program 22 may be limited.

(E-1) For example, a period of time in which the restored game program 22 can be executed may be limited. In more detail, when receiving the transfer file 26 from the host, time data indicating the reception time of the transfer file 26 is stored in the reception information storage section 420 together with the information (e.g. game program 22 and transfer file 26) restored from the transfer file 26.

When the game program 22 stored in the reception information storage section 420 is executed, the period of time elapsed after the time indicated by the time data stored in the reception information storage section 420 is calculated, and whether or not the period of time elapsed has reached a predetermined executable period in which the game program 22 can be executed is determined (e.g. step preceding to the step C1 in FIG. 8). When the executable period has not been exceeded, the game program 22 is continuously executed. When the period of time in which the game program 22 can be executed has been exceeded, an error message indicating that the period of time in which the game program 22 can be executed has been exceeded is displayed, and execution of the game program 22 is prohibited.

(E-2) The number of times that the restored game program 22 can be executed may be limited. In more detail, when receiving the transfer file 26 from the host, execution count data (initial value: "0") indicating the number of times that the restored game program 22 is executed is stored in the reception information storage section 420 together with the information (e.g. game program 22 and transfer file 26) restored from the transfer file 26.

When the game program 22 stored in the reception information storage section 420 is executed, the execution count stored in the reception information storage section 420 is incremented by "1", and whether or not the updated execution count has reached a predetermined executable count indicating the number of times that the game program 22 can be executed is determined (e.g. step preceding to the step C1 in FIG. 8). When the execution count has not reached the executable count, the game program 22 is continuously executed. When the execution count has reached the executable count, an error message indicating that the number of times that the game program 22 can be executed has been exceeded is displayed, and execution of the game program 22 is prohibited. Note that the executable count may be stored as the initial value of the execution count, the execution count may be decremented by "1" each time the game program 22 is executed, and execution of the game program 22 may be prohibited when the execution count has reached "0".

(F) The above-described embodiments illustrate the case where the invention is applied to the portable game device as the computer. Note that the invention may also be applied to other game devices such as consumer game devices and arcade game devices, personal computers provided with a communication function and can execute a game, or portable terminals such as mobile phones or PDAs, for example.

(G) The software converted into a transfer file is not limited to the game program. The software converted into a transfer file may be other types of application software such as music reproduction software. In this case, the invention may be applied to computers provided with a communication function such as portable terminals such as mobile phones or PDAs, or personal computers, for example.

(H) The communication method between instruments is not limited to wireless communication, but may be wired (cable) communication.

(I) The above-described embodiments illustrate the case where the transfer file conversion processing of software includes encryption and compression. Note that the transfer file conversion processing may include only one of encryption and compression. In this case, when restoring the received transfer file, decryption or decompression is performed corresponding to encryption or compression which has been performed for the transfer file.

Although only some embodiments of the invention are described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A computer-readable storage medium having transfer file data to be transferred to a plurality of computers in series, the transfer file data comprising:

a transfer file nested structure in which N number of copies of an original software is converted into a series of transfer files in a nested manner, a first transfer file including an N-th copy of the software and a second transfer file including N−1 number of copies of the software and being restored by restoration processing of a receiving computer of the plurality of computers, wherein N>1, and each copy of the software is restored by the restoration processing to the original software before being converted into a next transfer file.

2. The storage medium as defined in claim 1, wherein a first copy of the software is converted into a lowest-level transfer file at a base level of the nested structure, and a second copy of the software and the first transfer file data converted at an immediately lower level are converted into a new transfer file at a level higher than the base level, whereby the transfer file data is provided with the transfer file nested structure.

3. The storage medium as defined in claim 2, wherein the software at each level of the nested structure is software for causing a computer to execute processing corresponding to each level of the nested structure.

4. The storage medium as defined in claim 2, wherein the software at each level of the nested structure is software for causing a computer which has restored the software at the level to execute main processing, and receive execution reference data, which is data necessary for the main processing and is read and used when executing the main processing, from a transfer source computer.

5. The storage medium as defined in claim 4, wherein the software comprises software for causing a computer which has restored the software to determine whether or not to receive the execution reference data based on at least whether or not the execution reference data has been received, and receive the execution reference data from a transfer source computer when the computer has determined that the execution reference data is to be received.

6. The storage medium as defined in claim 5, wherein the software comprises software for causing a computer which has restored the software to determine whether or not to receive the execution reference data based on whether or not the execution reference data has been received and free space in a memory.

7. The storage medium as defined in claim 4, wherein the software comprises software for causing a transfer destination computer which has restored the software to select the execution reference data to be received from a plurality of pieces of execution reference data stored in a transfer source computer based on free space in a memory, and receive the selected execution reference data.

8. The storage medium as defined in claim 4, wherein
the software is game software for executing a specific game,
the execution reference data includes a plurality of pieces of game data, and
the software comprises software for causing a computer which has restored the software to determine the level of the nested structure of the restored software and execute a game based on the game data selected from the game data included in the received execution reference data corresponding to the determined level.

9. The storage medium as defined in claim 8, wherein
the execution reference data includes a plurality of pieces of game stage information as the game data, and
the software is game software for causing a computer which has restored the software to execute a game based on the game stage information selected from the game stage information included in the received execution reference data corresponding to the determined level.

10. The storage medium as defined in claim 8, wherein
the execution reference data includes a plurality of pieces of character information as the game data, and
the software is game software for causing a computer which has restored the software to execute a game based on the character information selected from the character information included in the received execution reference data corresponding to the determined level.

11. The storage medium as defined in claim 1,
wherein the conversion into the transfer file includes at least encryption; and
wherein the transfer file data is decrypted during the restoration processing.

12. The storage medium as defined in claim 1,
wherein the conversion into the transfer file includes at least compression; and
wherein the transfer file data is decompressed during the restoration processing.

13. The storage medium as defined in claim 1, wherein the software comprises software for causing a transfer destination computer which has restored the software to manage transfer history of the transfer file data between the computers as succession history information, and update the managed succession history information by acquiring device identification information of a transfer source computer and/or succession history information managed by the transfer source computer from the transfer source computer.

14. The storage medium as defined in claim 13, wherein the software comprises software for causing the transfer destination computer which has restored the software to perform specific transfer history-related processing based on the managed succession history information.

15. The storage medium as defined in claim 1, wherein the software comprises software for causing a transfer destination computer which has restored the software to determine a period of time elapsed after the restoration of the software, and prohibit execution of the software when the determined period of time elapsed has reached a predetermined executable period.

16. The storage medium as defined in claim 1, wherein the software comprises software for causing a transfer destination computer which has restored the software to count a number of times that the software is executed after the restoration of the software, and prohibit execution of the software when the counted number has reached a predetermined executable count.

17. The storage medium as defined in claim 1, wherein $N \geq 3$.

18. A method of processing transfer file data transferred between computers, the method comprising:
transmitting, by a first computer, the transfer file data including a first transfer file, the first transfer file formed in a nested structure and including N number of copies of an original software and a second transfer file; and
receiving, by a second computer, and restoring from the first transfer file an N-th copy of the software and the second transfer file by restoration processing of the second computer, the second transfer file including N−1 number of copies of the software and a third transfer file, wherein
N>1, and
each copy of the software is restored by the restoration processing to the original software before being converted into a next transfer file.

19. The method as defined in claim 18, wherein a first copy of the software is converted into a first-level transfer file at a base level of the nested structure, and a second copies of the software and transfer file data at an immediately lower level are converted into a new transfer file at a level higher than the immediately lower level, whereby the transfer file data is provided with the nested structure.

20. The method as defined in claim 18, wherein $N \geq 3$.

* * * * *